United States Patent [19]

Weinmeister et al.

[11] Patent Number: 5,203,621
[45] Date of Patent: Apr. 20, 1993

[54] ROOF-MOUNTED FLOOD LIGHT ASSEMBLY

[75] Inventors: Roger Weinmeister, Ft. Collins; Donald Weinmeister, Windsor, both of Colo.

[73] Assignee: Super Vacuum Manfacturing Co., Inc., Loveland, Colo.

[21] Appl. No.: 867,747

[22] Filed: Apr. 10, 1992

[51] Int. Cl.⁵ .............................. B60Q 1/06
[52] U.S. Cl. ...................... 362/66; 362/74; 362/233; 362/250; 362/428
[58] Field of Search ............ 362/66, 70, 74, 233, 362/250, 419, 427, 428, 430

[56] References Cited

U.S. PATENT DOCUMENTS

| | | | |
|---|---|---|---|
| Re. 28,041 | 6/1974 | Loffler et al. | 362/233 |
| 1,743,535 | 1/1930 | Edmondson | 362/414 |
| 2,694,573 | 11/1954 | Walker | 362/1 X |
| 2,899,540 | 8/1959 | Allmand et al. | 362/192 |
| 3,292,322 | 12/1966 | Pfaff et al. | 52/28 |
| 3,463,916 | 8/1969 | DeBella | 52/28 |
| 3,569,690 | 3/1971 | Nelson | 362/62 |
| 3,783,267 | 1/1974 | Thomas | 362/428 |
| 3,813,536 | 5/1974 | Kempkes | 362/66 |
| 3,949,218 | 4/1976 | Hayward | 362/233 |
| 4,220,981 | 9/1980 | Koether | 362/61 |
| 4,423,469 | 12/1983 | Zerlaut et al. | 362/2 |
| 4,450,507 | 5/1984 | Gordin | 362/61 |
| 4,488,209 | 12/1984 | Gosswiller | 362/386 |
| 4,712,167 | 12/1987 | Gordin et al. | 362/233 |
| 4,835,515 | 5/1989 | McDermott et al. | 340/472 |

Primary Examiner—Stephen F. Husar
Attorney, Agent, or Firm—James R. Young

[57] ABSTRACT

A flood light assembly for mounting on the roof or top of an emergency vehicle. The flood light assembly is fully retractable and extendable and capable of complete rotation. Further, all of the components are structured and proportioned in such a manner that they fold together into a very compact, nested configuration for storage on the roof or top of the vehicle.

2 Claims, 5 Drawing Sheets

ROOF-MOUNTED FLOOD LIGHT ASSEMBLY

BACKGROUND OF THE INVENTION

1. Field of the Invention

The present invention relates generally to flood light assemblies and more specifically to a fully retractable and extendable and fully rotatable flood light assembly for mounting on the roof or top of an emergency vehicle.

2. Description of the Prior Art

It is often necessary for emergency vehicles, such as fire trucks, rescue vehicles, and the like to carry flood light equipment for lighting areas in which emergency personnel are working. To be effective, such flood light equipment has to be quite large with a number of lights, and it has to be easy to direct and redirect in many directions. Current flood light assemblies that are large enough to meet these criteria generally have massive supporting and lifting structures that require special components and mountings that take a substantial amount of space in vehicle bodies, which often are already over crowded with essential equipment and which are expensive. The light assemblies shown in the following patents are typical of such units: W. Hayward, U.S. Pat. No. 3,949,218, issued in 1976; M. Gordin, U.S. Pat. No. 4,450,507, issued in 1984; and M. Gordin et al., U.S. Pat. No. 4,712,167, issued in 1987. There are, of course, some smaller, roof or top-mounted lights, such as that shown in E. Gossmiller, U.S. Pat. No. 4,488,209, issued in 1984, but they tend to be quite small with limited versatility and limited lighting power.

Consequently, there remains a need for a flood light assembly that is very compact and suitable for mounting on the roof or top of an emergency vehicle, yet is substantial in size and lighting ability and completely versatile for aiming in any direction when extended.

SUMMARY OF THE INVENTION

Accordingly, it is a general object of this invention to provide an improved flood light assembly for use on emergency vehicles.

A more specific object of this invention is to provide a durable, compact flood light assembly that can be mounted easily on the roof or top of a vehicle, yet which is quite substantial in size and lighting ability and universally aimable in any direction.

Additional objects, advantages, and novel features of the invention are set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described herein, a flood light assembly has a compact base adapted to mount on the roof of a vehicle, a movable platform that can be lifted in an arc above the base, a lift mechanism for lifting the platform, an elongated light mast with a bank of lights mounted on the platform with a tilt or pivot drive and a rotational drive. All of these components are structured and proportioned in such a manner that they fold together into a very compact, nested configuration for storage on the roof or top of the vehicle.

BRIEF DESCRIPTION OF THE DRAWINGS

The accompanying drawings, which are incorporated in and form a part of the specifications, illustrate the preferred embodiments of the present invention, and together with the description serve to explain the principles of the invention.

DETAILED DESCRIPTION OF THE PREFERRED EMBODIMENT

Figure 1:
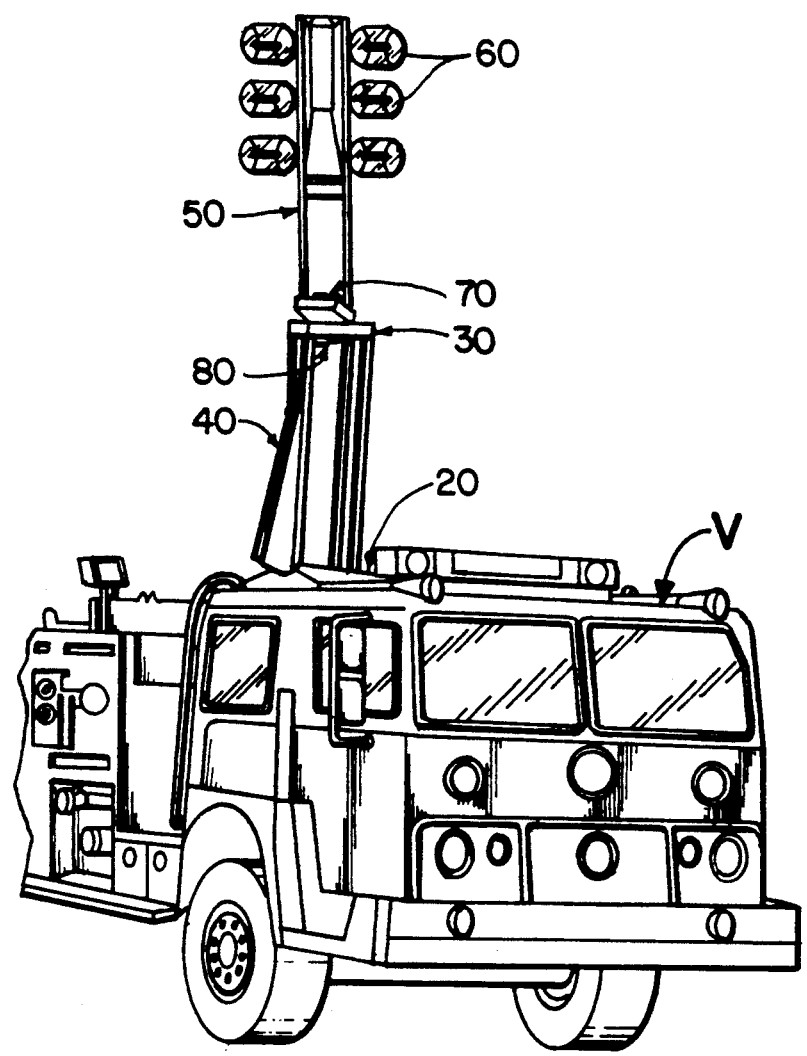
FIG. 1 is a perspective view of the flood light assembly of this invention mounted on an emergency vehicle and fully extended for use.

The flood light assembly 10 of the present invention is shown in FIG. 1 mounted on the roof of an emergency vehicle V, such as a fire truck or rescue vehicle. It is comprised essentially of a base 20 mounted on the roof or top of the vehicle V, a platform 30 connected to the base 20 by a lift assembly 40, a light mast 50 mounted on the platform 30 for supporting a plurality of flood lights 60, a mast tilt mechanism 70 for tilting the light mast 50 about a horizontal axis, and a mast rotation mechanism 80 mounted in the platform 30 for rotating the light mast 50 about a vertical axis.

Figure 2:
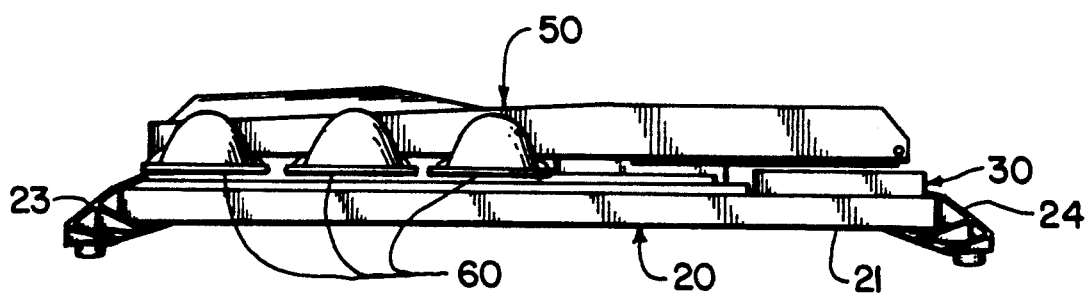
FIG. 2 is a front plan view of the flood light assembly when it is in its fully collapsed into its nested storage position.

Essentially, the flood light assembly 10 has a collapsed storage position, as shown in FIG. 2, with the base 20 adapted for easy mounting on the top or roof of the vehicle V (not shown in FIG. 2). When it is desired to use the flood light assembly 10, the lift assembly 40 is used to lift the platform 30 from the collapsed storage position shown in FIG. 2 to the extended position of FIG. 4, as illustrated by the arrow 12 in FIG. 4. The light mast 50 can be tilted about a horizontal axis 51 anywhere from a horizontal position, shown as 50' in FIG. 5, through an arc of about 110° to the position 50", as shown by the arrow 14 in FIG. 5. The light mast 50 can also be rotated 360° or more about a vertical axis 61, as shown by the arrow 62 in FIG. 4. The mast 50 is shown in FIG. 5 rotated 90 degrees from its collapsed storage position of FIG. 2.

Figure 3:
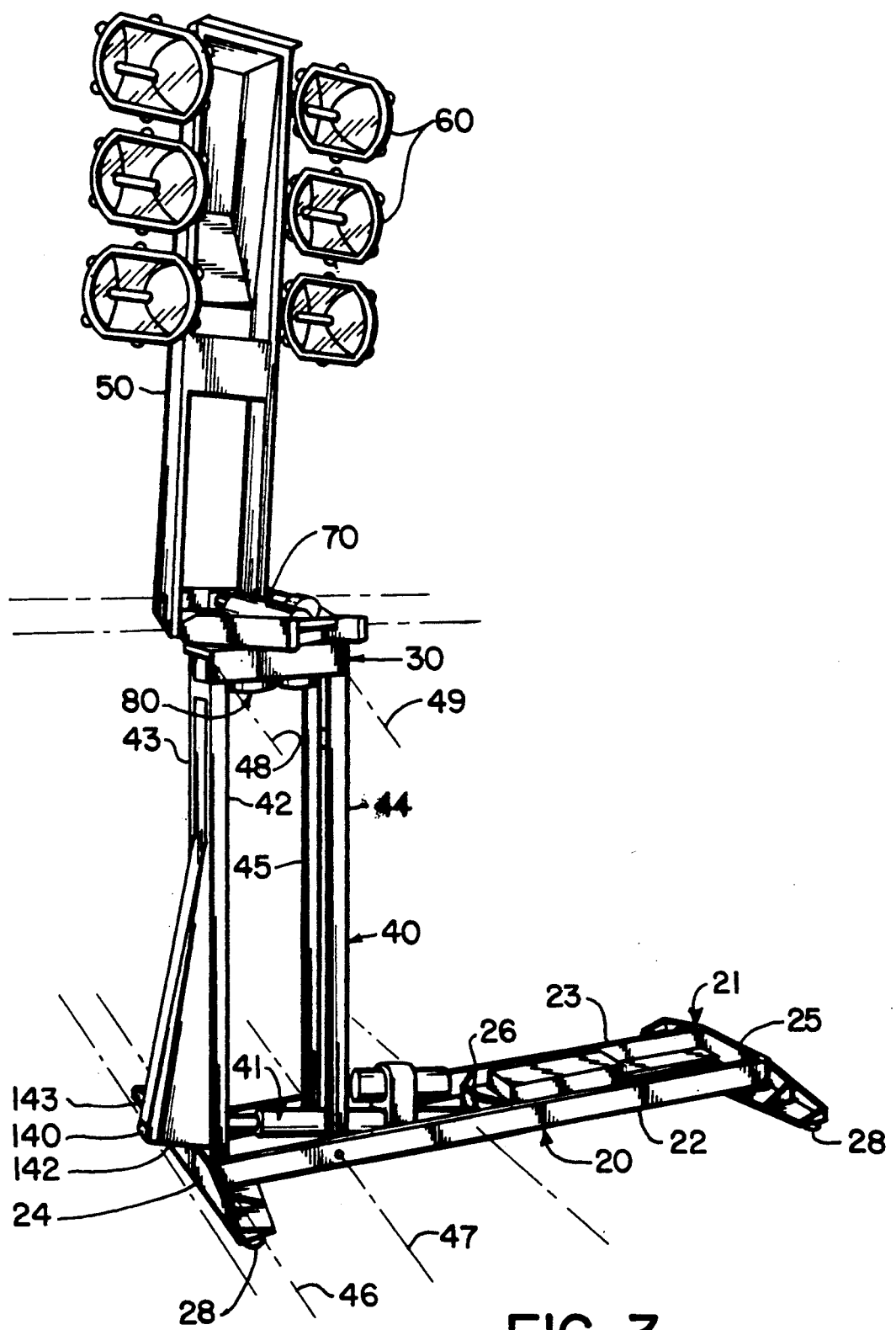
FIG. 3 is an enlarged perspective view of the flood light assembly of the present invention fully extended and with the light mast partially rotated in relation to the extended platform.

Referring now primarily to FIGS. 2 and 3, the base 20 comprises a base frame 21 with two elongated longitudinal frame members 22, 23 fastened at each end to two shorter transverse frame members 24, 25. A mid-cross member 26 provides an anchor for the linear lift actuator 41 of lift assembly 40, as will be described in more detail below. The transverse frame members 24, 25 have mounting feet 28 at each end to facilitate mounting the base to the vehicle V.

Figure 8:
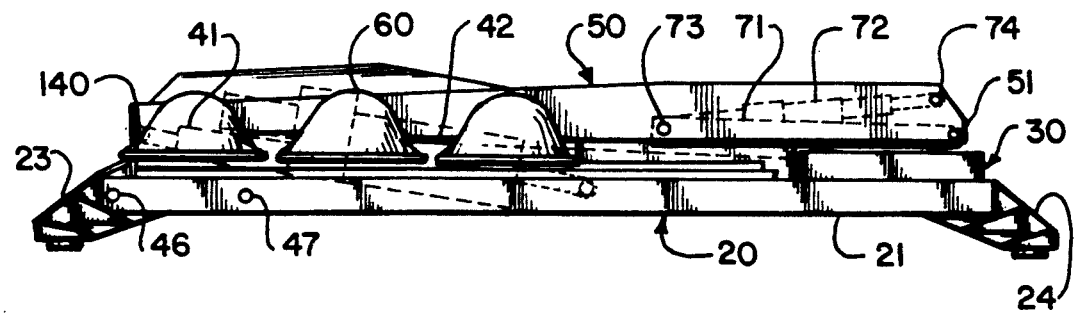
FIG. 8 is a rear plan view that illustrated the nested position of the left actuator in the lift structure when in the collapsed position.

The lift assembly 40 preferably comprises a parallelogram arm structure comprising four elongated lift arms 42, 43, 44, 45 mounted at their proximal ends in the frame members 22, 23 of base 20 to pivot about two axis 46, 47. The distal ends of lift arms 42, 43, 44, 45 are mounted in the platform 30 to pivot about two axes 48, 49. A linear lift actuator 41, preferably an electrically operated screw, but which can also be hydraulic, pneumatic, or any other suitable linear actuator, is mounted between mid-cross member 26 and to a rod 140 in laterally extended portions 142, 143 of lift arms 42, 43 near their proximal ends. Therefore, extension of linear lift actuator 41 causes the lift arms 42, 43, 44, 45 to pivot about respective axes 46, 47 to lift platform 30 to the extended position of FIG. 3. Because of the parallelogram arrangement, platform 30 stays substantially horizontal throughout the range of lift mechanism 40. This horizontal orientation not only keeps the light mast stabilized and controllable to desired positions, but it contributes to the compact nested configuration when folded, as shown in FIGS. 2 and 8. The extended portions 142, 143 provide the leverage for the linear actuator 41 to operate the lift assembly 40.

Figures 4, 5:
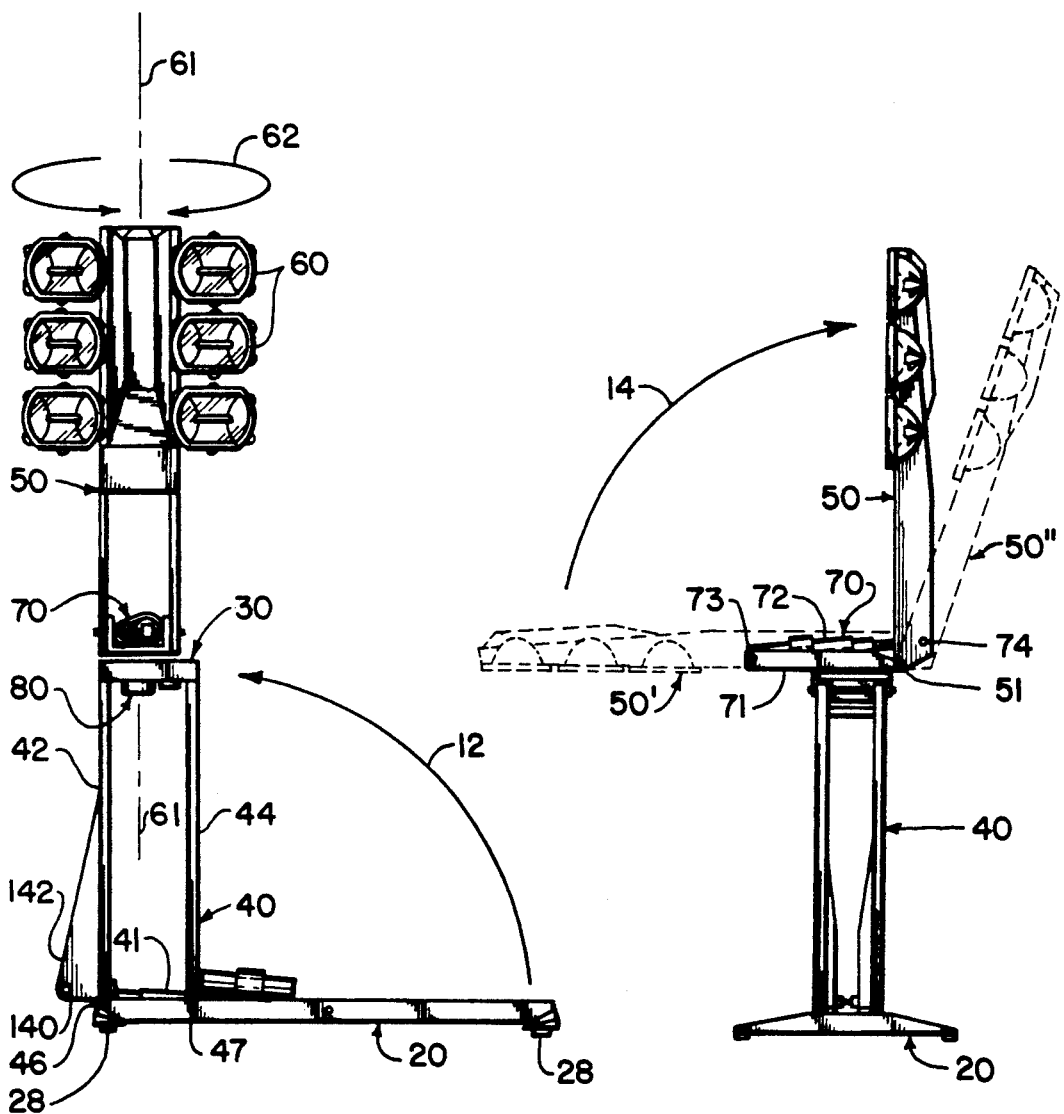
FIG. 4 is a front elevation view of the flood light assembly of the present invention fully extended and illustrating the 360° rotational ability of the light mast about a vertical axis.
FIG. 5 is a right side elevation view of the light assembly fully extended and illustrating the range of tilt about a horizontal axis.
Figure 6:
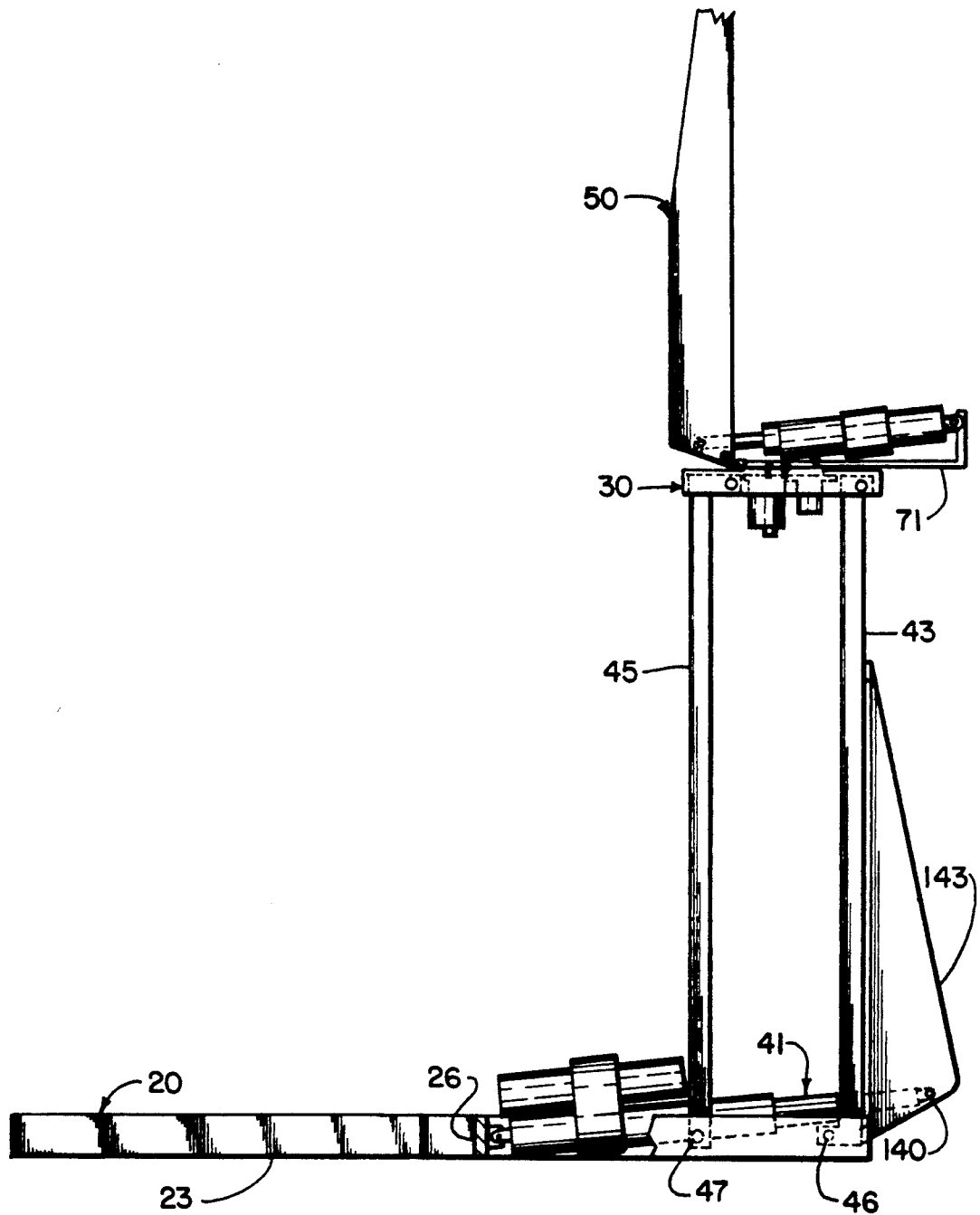
FIG. 6 is a rear elevation view of the principle structural components of the flood light assembly showing the primary lift mountings for the platform and the light mast according to this invention.

The mast tilt mechanism 70 is best seen in FIGS. 5 and 6. A tilt frame 71 is mounted on a rotatable plate 81 of the rotation mechanism 80 (FIG. 7), which itself is mounted in platform 30. The proximal end of light mast 50 is pivotally attached at 51 to the tilt frame 71. A linear tilt actuator 72 is anchored at one end to a pin 73 in the tilt frame 71 and is attached at the other end to a pin 74 in mast 50. Therefore, as the linear actuator 72 extends, it causes mast 50 to pivot, as shown by arrow 14 in FIG. 5. Of course, retraction of the linear actuator 72 causes the mast to pivot downwardly. The tilt linear actuator 72 is preferably an electric motor-driven screw, but it can be hydraulic, pneumatic, or any other suitable actuator.

Figure 7:
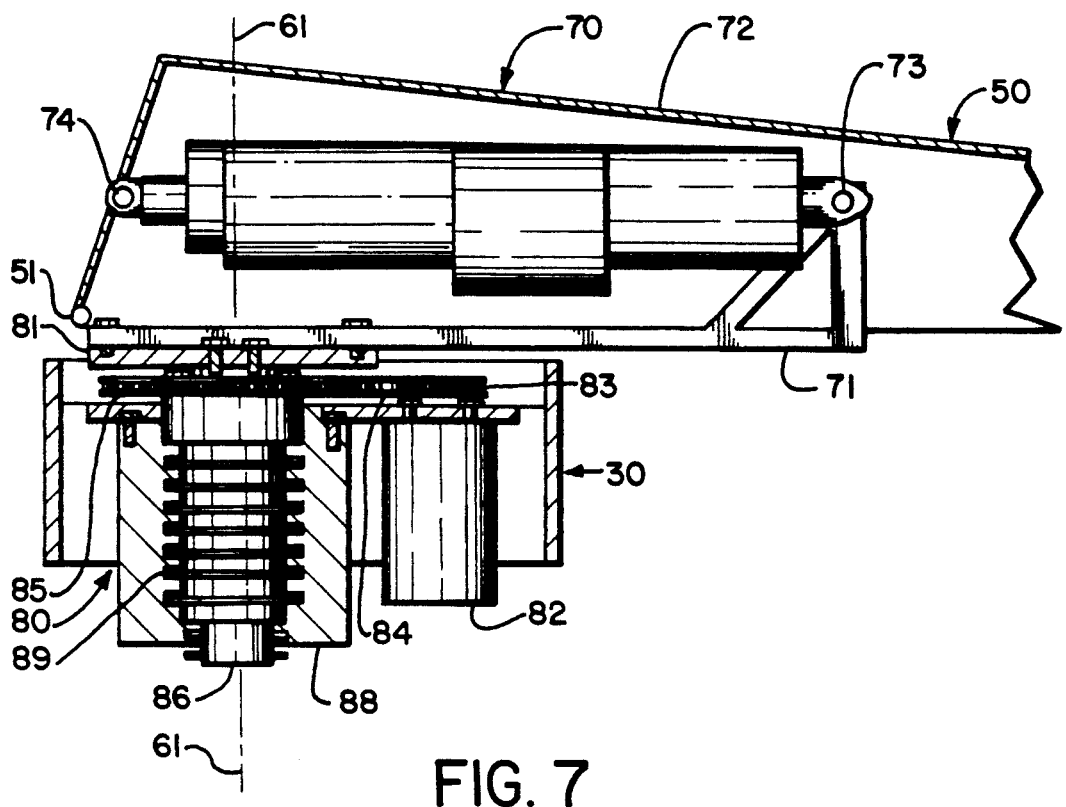
FIG. 7 is an enlarged cross-sectional view of the rotational drive assembly in the platform for rotating the light mast and illustrates the folded or nested position of the tilt actuator in the mast over the platform.

The mast rotation mechanism 80 is best described by reference to FIG. 7. A motor 82 mounted in platform 30 drives a first sprocket 83. A chain 84 around sprocket 83 drives a second sprocket 85 mounted on a shaft 86, causing the shaft 86 to rotate. A plate 81 is affixed to the upper end of shaft 86, so that it also rotates as shaft 86 rotates. The tilt frame 71 is fastened to the plate 81, so that when the motor 82 is actuated, it rotates tilt frame 71, on which the light mast 50 is mounted by pin 51, so it rotates the mast 50 about the axis 61 of shaft 86. Of course, since the tilt mechanism 70 is mounted on tilt frame 71, as described above, it does not matter whether the mast 50 is horizontal or extended, it can be rotated in any position by the rotation mechanism 80. The rotation mechanism 80 also includes a 360° swivel electrical contact ring 88 with a plurality of swivel contacts 89 so that electric power through wires (not shown) can be supplied to the lights 60 and electric actuator 72, regardless of how the mast is rotated. Such swivel contact rings 88 are well known devices and readily available in the commercial market, so it will not be described in any more detail here.

Referring to FIGS. 4 and 5, the light mast 50 is very versatile, even though it is quite massive and carries a substantial number of large lights 60. In the vertical mast 50 position, it can be rotated 360° or more to aim the light in any direction. It can also be rotated 360° when in any position between 50' and 50" of FIG. 5. In the 50' position, the lights flood the area immediately adjacent the vehicle V for close work. In the super-extended position 50", it can illuminate higher up on the sides of buildings, in trees, or up the sides of hills. Therefore, the flood light assembly 10 of this invention, while being compact enough to be roof mountable on the vehicle V, has a versatility equal to the more conventionally mounted larger units and far exceeding the capabilities of previous smaller units that could be roof mounted.

The foregoing description is considered as illustrative only of the principles of the invention. Further, since numerous modifications and changes will readily occur to those skilled in the art, it is not desired to limit the invention to the exact construction and processes shown as described above. Accordingly, all suitable modifications and equivalents may be resorted to falling within the scope of the invention as defined by the claims which follow.

The embodiments of the invention in which an exclusive property or privilege is claimed are defined as follows:

1. A flood light assembly, comprising:
    a base adapted for mounting on the top of a vehicle;
    a platform;
    parallelogram lift means connecting said platform to said base in such a manner that said platform is movable through an arc toward and away from said base while maintaining a constant attitude in relation to said base;
    an elongated light mast having a proximal end and a distal end, said proximal end of said mast being mounted on said platform in such a manner that it is both rotatable and pivotal in relation to said platform;
    tilt means connected to said light mast for pivoting said light mast in relation to said platform;
    rotation actuator means in said platform and connected to said tilt means for rotating said tilt means and mast in relation to said platform; and
    a light set mounted on the distal end of said light mast.

2. The flood light assembly of claim 1, wherein said tilt means and said rotation means nest in said light mast and said lift means nests together in said mast folded onto said base when in collapsed to storage configuration.

* * * * *